US008522314B1

(12) United States Patent
Vasquez et al.

(10) Patent No.: US 8,522,314 B1
(45) Date of Patent: Aug. 27, 2013

(54) VOIP PHONE AUTHENTICATION

(75) Inventors: Juan Vasquez, San Jose, CA (US);
Saheylee Roy, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/556,329

(22) Filed: Jul. 24, 2012

(51) Int. Cl.
*H04L 29/06* (2006.01)
(52) U.S. Cl.
USPC ............... 726/3; 726/29; 370/331; 370/338; 370/352
(58) Field of Classification Search
USPC ................... 726/3, 29; 709/220, 203, 223
See application file for complete search history.

(56) References Cited

U.S. PATENT DOCUMENTS

| 6,958,992 | B2 * | 10/2005 | Lee et al. ................... 370/352 |
| 7,315,943 | B2 | 1/2008 | Shibata |
| 7,735,114 | B2 | 6/2010 | Kwan et al. |
| 2003/0167298 | A1 * | 9/2003 | Bazinet et al. ............. 709/203 |
| 2006/0248600 | A1 * | 11/2006 | O'Neill ...................... 726/29 |
| 2008/0075064 | A1 | 3/2008 | Krantz et al. |
| 2009/0168756 | A1 | 7/2009 | Kurapati et al. |
| 2009/0238172 | A1 | 9/2009 | Tanizawa et al. |
| 2010/0023603 | A1 * | 1/2010 | Archer et al. ................. 709/220 |
| 2010/0284368 | A1 * | 11/2010 | Haddad et al. ................ 370/331 |
| 2011/0022841 | A1 | 1/2011 | Petillo |
| 2012/0069838 | A1 * | 3/2012 | Sarkar et al. ................. 370/352 |

OTHER PUBLICATIONS

Voice over Internet protocol (VoIP); Goode, Proceedings of the IEEE; Date of Publication: Sep. 2002 AT&T Labs., Weston, CT; vol. 90, Issue: 9; pp. 1495-1517.*
"Analysis of Token and Ticket Based Mechanisms for Current VoIP Security Issues and Enhancement Proposal"; Battistello et al; Communications and Multimedia Security Lecture Notes in Computer Science vol. 6109, 2010, pp. 154-165, Springer link.*
Deploying 802.1x-Based Port Authentication on the Cisco Virtual Office Solution; Guide; Cisco Systems, Inc.; pp. 1-12; 2009.

* cited by examiner

*Primary Examiner* — Taghi Arani
*Assistant Examiner* — Jason Lee
(74) *Attorney, Agent, or Firm* — Leydig, Voit & Mayer, Ltd.

(57) ABSTRACT

Described are computer-based methods and apparatuses, including computer program products, for voice over internet protocol (VoIP) phone authentication. In some examples, the method includes receiving an authentication request from a computing device; authenticating the computing device for access to a network based on the authentication request; determining if a VoIP endpoint device is associated with a network address associated with the authentication request; and authenticating the VoIP endpoint device if the VoIP endpoint device is associated with the network address.

9 Claims, 7 Drawing Sheets

VOIP PHONE AUTHENTICATION

TECHNICAL FIELD

The disclosure relates generally to voice over internet protocol (VoIP) communications.

BACKGROUND

Generally, VoIP devices are authenticated by a VoIP system and computing devices are authenticated by a separate authentication system. In some scenarios, the VoIP devices are not authenticated but are assumed to be authorized by the connection to the VoIP system. Thus, a need exists in the art for improved VoIP phone authentication.

SUMMARY

One approach is a system that authenticates voice over internet protocol (VoIP) phones. The system includes a computing device configured to transmit an authentication request for a user to an authentication server. The authentication request is relayed via a VoIP endpoint device. The computing device and the VoIP endpoint device are associated with the user. The system further includes the authentication server configured to receive the authentication request from the computing device via the VoIP endpoint device, authenticate the computing device based on the authentication request, generate an access token for the computing device based on the authentication of the computing device, and transmit the access token to a network access system. The system further includes the network access system configured to receive the access token from the authentication server, provide network access to the computing device via the network access system based on the access token, determine if the VoIP endpoint device is associated with a network address of the computing device, and provide network access to the VoIP endpoint device if the VoIP endpoint device is associated with the network address of the computing device.

Another approach is a method that authenticates VoIP phones. The method includes receiving an authentication request from a computing device; authenticating the computing device for access to a network based on the authentication request; determining if a VoIP endpoint device is associated with a network address associated with the authentication request; and authenticating the VoIP endpoint device if the VoIP endpoint device is associated with the network address.

Another approach is a network access system that authenticates VoIP phones. The system includes a computing device authentication module configured to authenticate a computing device for access to a network based on an authentication request, the authentication request received from the computing device via a voice over internet protocol (VoIP) endpoint device. The system further includes a network module configured to determine if the VoIP endpoint device is associated with a network address associated with the authentication request. The system further includes a VoIP endpoint device authentication module configured to authenticate the VoIP endpoint device based on the determination if the VoIP endpoint device is associated with the network address.

In some examples, any of the approaches above can include one or more of the following features.

In some examples, the network access system is further configured to deny network access to the VoIP endpoint device based on de-authentication of the associated computing device.

In some examples, the network access system is further configured to generate a VoIP access token for the VoIP endpoint device if the VoIP endpoint device is associated with the network address of the computing device, and transmit the VoIP access token to a VoIP system. In some examples, the VoIP system is further configured to receive the VoIP access token from the network access system, and enable establishment of a VoIP call by the VoIP endpoint device based on the VoIP access token.

In some examples, the VoIP system is further configured to enable the VoIP endpoint device for use by the user based on the VoIP access token.

In some examples, the network access system is further configured to relay communication between the computing device and one or more application servers based on the authentication of the computing device.

In some examples, the network access system is further configured to relay communication between the VoIP endpoint device and a VoIP system if the VoIP endpoint device is associated with the network address of the computing device.

In some examples, the authentication request is relayed via the VoIP endpoint device.

In some examples, the determining if the VoIP endpoint device is associated with the network address further includes determining the network address associated with the authentication request and comparing the network address and a network address of the VoIP endpoint device.

In some examples, the determining if the VoIP endpoint device is associated with the network address further includes determining a network route associated with the authentication request; determining a network route associated with the VoIP endpoint device; and comparing the network route associated with the authentication request and the network route associated with the VoIP endpoint device.

In some examples, the network address includes a medium access control (MAC) address, an internet protocol address, a physical layer address, and/or a transport layer address.

In some examples, the method further includes providing the computing device with access to one or more application servers based on the authentication of the computing device.

In some examples, the method further includes providing the VoIP endpoint device with access to a VoIP system based on the authentication of the VoIP endpoint device.

In some examples, the method further includes terminating authentication of the VoIP endpoint device based on a timeout parameter; determining if the VoIP endpoint device is associated with the network address associated with an authenticated computing device; and re-authenticating the VoIP endpoint device based on the determination if the VoIP endpoint device is associated with the authenticated computing device.

In some examples, the timeout parameter is a predetermined timeout parameter, a dynamically generated timeout parameter, and/or an operating time period for the VoIP endpoint device.

In some examples, the system further includes a network map module configured to generate a map of a network associated with the network access system based on network communications through the network access system.

In some examples, the network module is further configured to determine the network address associated with the authentication request based on the map of the network; determine a network address of the VoIP endpoint device based on the map of the network; and comparing the network address and the network address of the VoIP endpoint device.

In some examples, the network module is further configured to determine a network route associated with the authentication request based on the map of the network; determining a network route associated with the VoIP endpoint device based on the map of the network; and compare the network route associated with the authentication request and the network route associated with the VoIP endpoint device.

The VoIP phone authentication systems and methods described herein (hereinafter "technology") can provide one or more of the following advantages. An advantage of the technology is that VoIP endpoint devices can be authenticated based on a computing device authentication, thereby decreasing the authentication time for a user while increasing the overall security of the system. Another advantage of the technology is that the single sign-on (SSO) capabilities of the authentication of the VoIP endpoint device based on the authentication of the computing device decreases administrative costs for maintaining a separate authentication service for the VoIP endpoint devices. Another advantage of the technology is that VoIP endpoint devices can be authenticated based on organization wide authentication services, thereby decreasing authentication errors due to platform based authentication solutions directed to just the VoIP endpoint devices. Another advantage of the technology is that the automatic verification of the network addresses and/or network routes enables the technology to quickly and efficiently authenticate the VoIP endpoint device based on the associated computing device's authentication, thereby increasing security for the system by reducing the risk of an unauthorized VoIP endpoint device accessing network resources.

Another approach is a voice over internet protocol (VoIP) phone authentication method. The method includes receiving an authentication request from a computing device connected to a VoIP endpoint device, wherein the authentication request is relayed via the VoIP endpoint device. The method also includes authenticating the computing device for access to a network based on the authentication request. The method also includes determining a network address associated with the authentication request. The method also includes comparing the network address associated with the authentication request and the VoIP endpoint device network address. The method also includes determining that the VoIP endpoint device is associated with the network address associated with the authentication request based on the comparison of the network address associated with the authentication request and the VoIP endpoint device network address. The method also includes authenticating the VoIP endpoint device if the VoIP endpoint device is associated with the network address.

In some examples, the method also includes denying network access to the VoIP endpoint device based on de-authentication of the associated computing device. In some examples, the method also includes generating a VoIP access token for the VoIP endpoint device if the VoIP endpoint device is associated with the network address of the computing device, transmitting the VoIP access token to a VoIP system, receiving the VoIP access token, and enabling establishment of a VoIP call by the VoIP endpoint device based on the VoIP access token.

In some examples, the method also includes enabling the VoIP endpoint device for use by a user based on the VoIP access token. In some examples, the method also includes relaying communication between the computing device and one or more application servers, via the VoIP endpoint device, based on the authentication of the computing device.

Other aspects and advantages of the present disclosure will become apparent from the following detailed description, taken in conjunction with the accompanying drawings, illustrating the principles of the disclosure by way of example only.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

The voice over internet protocol (VoIP) phone authentication methods and apparatuses include technology that, generally, authenticates VoIP endpoint devices (e.g., phone, speaker phone) based on authentication of associated computing devices (e.g., personal computer, handheld computer). The technology utilizes authentication mechanisms for the computing device to validate that the associated VoIP endpoint device should also be authenticated, thereby reducing the administrative overhead of maintaining separate authentication services for VoIP endpoint devices and other components of an enterprise information technology (IT) environment. The technology can authenticate the VoIP endpoint devices based on network addresses (e.g., medium access control (MAC) address, internet protocol (IP) address) of the VoIP endpoint device and the associated computing device and/or network routes (e.g., intermediate nodes in a network, last hop network port) to the VoIP endpoint device and the associated computing device. The authentication based on network information (e.g., network address, network route) advantageously decreases the administrative overhead associated with authentication configuration while decreasing unauthorized user of network resources (e.g., VoIP calls, VoIP services).

For example, in operation, a user logs into a computing device utilizing user login credentials (e.g., username and password combination; username, password, and secure identification number, one-time password). The user via the computing device is authenticated based on an internal login database and/or an authentication server utilizing the user login credentials. A VoIP endpoint device associated with the computing device (e.g., physically connected to each other, logically connected to each other) is then authenticated based on the user's authentication via the computing device. The authentication of the VoIP endpoint device can be based on network addresses and/or network routes. The authentication of the VoIP endpoint device based on the user's authentication via the computing device advantageously mitigates security risks associated with un-authenticated VoIP endpoint devices accessing network resources (e.g., VoIP system, application server, directory server).

In some examples, the technology compares the network addresses for the computing device and the VoIP endpoint device to determine if the computing device and the VoIP endpoint device are associated with each other. Table 1 illustrates network addresses and the association results. As illustrated in Table 1, if the computing device's network address and the VoIP endpoint device's network address match, the VoIP endpoint device is authenticated based on the authentication of the computing device. As illustrated in Table 1, the computing device and the VoIP endpoint device can have the same network address. The computing device and the VoIP endpoint device can have the same network address since the VoIP endpoint device can be configured to forward all network traffic from the computing device through the VoIP endpoint device.

Table 2 illustrates authentication of the VoIP endpoint devices based on whether the computing device has been authenticated. The computing devices illustrated in Table 2 authenticate utilizing an authentication server and/or any other type of authentication service (e.g., Kerberos, login and password). As illustrated in Table 2, even though the network addresses for the DAC11 computing device and the 555-555-1213 VoIP endpoint device match (i.e., both are 06-00-00-09-00-BC), the DAC11 computing device is not authenticated (e.g., the user has not logged into the computing device, the computing device is not authorized to access the network) and therefore, the 555-555-1213 VoIP endpoint device is not authenticated.

The authentication of the VoIP endpoint device utilizing the network addresses advantageously enables the technology to determine if the computing device and the VoIP endpoint device are associated with each other without requiring explicit authentication credentials from both devices. In other examples, each network device (e.g., access layer switches directly connected to the device) maintains a network address table (also referred to as a network map) (e.g., capturing the MAC (CAM) address table, internet protocol table, port table) for the connected devices. The technology can utilize the network address table to identify the network addresses for the devices. The network device can periodically maintain the network address table and/or can maintain the network address table based on requests for the respective information.

In some examples, the technology compares the network routes (e.g., final hop of the route, every hop of the route) for the computing device and the VoIP endpoint device to determine if the computing device and the VoIP endpoint device are associated with each other. Table 3 illustrates network routes and the association results. As illustrated in Table 3, if the computing device's network route and the VoIP endpoint device's network route match or substantially match, the VoIP endpoint device is authenticated based on the authentication of the computing device.

Table 4 illustrates the authentication of the VoIP endpoint devices based on the authentication of the computing device. The computing devices illustrated in Table 4 authenticate utilizing an authentication server and/or any other type of authentication service (e.g., Kerberos, login and password). As illustrated in Table 4, even though the network routes for the HJK33 computing device and the 555-555-1215 VoIP endpoint device substantially match (i.e., the computing device network route hops through the 555-555-1215 VoIP endpoint device), the HJK33 computing device is not authenticated (e.g., the user has not logged into the computing device, the computing device is not authorized to access the network) and therefore, the 555-555-1215 VoIP endpoint device is not authenticated.

The authentication of the VoIP endpoint device utilizing the network routes advantageously enables the technology to determine if the computing device and the VoIP endpoint device are associated with each other without requiring explicit authentication credentials from both devices. In some examples, a network access system and/or any other system associated with the system (e.g., authentication server) utilize a reverse traceroute to the computing device and the VoIP endpoint device to determine the network routes for the devices.

TABLE 1

Network Addresses

| Computing Device Identifier | Computing Device Network Address | VoIP Endpoint Device Identifier | VoIP Endpoint Device Network Address | Authentication of VoIP Endpoint Device |
|---|---|---|---|---|
| ABC | 06-00-11-00-22-00 | 555-555-1111 | 06-00-11-00-22-00 | Authentication Confirmed |
| DAC | 06-00-00-09-00-AB | 555-555-1212 | 06-00-00-09-00-AB | Confirmation Confirmed |
| HJK | 192.168.1.2 | 555-555-1313 | 192.168.1.6 | Confirmation Denied |
| JKL | Port 23B | 555-555-1414 | Port 23B | Authentication Confirmed |

TABLE 2

Network Addresses

| Computing Device Identifier | Computing Device Network Address | Authentication of Computing Device | VoIP Endpoint Device Identifier | VoIP Endpoint Device Network Address | Authentication of VoIP Endpoint Device |
|---|---|---|---|---|---|
| ABC11 | 06-00-11-00-22-11 | Authenticated | 555-555-1112 | 06-00-11-00-22-11 | Authentication Confirmed |
| DAC11 | 06-00-00-09-00-BC | Not Authenticated | 555-555-1213 | 06-00-00-09-00-BC | Authentication Denied |
| HJK11 | 192.168.1.4 | Authenticated | 555-555-1314 | 192.168.1.6 | Authentication Denied |
| JKL11 | Port 23BC | Authenticated | 555-555-1415 | Port 23BC | Authentication Confirmed |

TABLE 3

Network Routes

| Computing Device Identifier | Computing Device Network Route | VoIP Endpoint Device Identifier | VoIP Endpoint Device Network Route | Authentication of VoIP Endpoint Device |
|---|---|---|---|---|
| ABC | Route -> GHJ to LJK to ADA to ABC | 555-555-1111 | Route -> GHJ to LJK to ADA to 555-555-1111 | Authentication Confirmed (match until last hop) |
| DAC | Route -> GHJ to LJK to HJK to 555-555-1212 | 555-555-1212 | Route -> GHJ to LJK to HJK to 555-555-1212 | Confirmation Confirmed (complete match) |
| HJK | Route -> GHJ to LJK to 555-555-1313 to HJK | 555-555-1313 | Route -> GHJ to LJK to 555-555-1313 | Confirmation Confirmed (computing device hops through phone) |
| JKL | Route -> GHJ to JJJ to LLL to JKL | 555-555-1414 | Route -> GHJ to JJ3 to LL3 to 555-555-1414 | Authentication Denied |

TABLE 4

Network Routes

| Computing Device Identifier | Computing Device Network Route | Authentication of Computing Device | VoIP Endpoint Device Identifier | VoIP Endpoint Device Network Route | Authentication of VoIP Endpoint Device |
|---|---|---|---|---|---|
| ABC11 | Route -> GHJ to LJK to ADA11 to ABC11 | Authenticated | 555-555-1112 | Route -> GHJ to LJK to ADA11 to 555-555-1112 | Authentication Confirmed (match until last hop) |
| DAC22 | Route -> GHJ to LJK to HJK22 to 555-555-1213 | Authenticated | 555-555-1213 | Route -> GHJ to LJK to HJK22 to 555-555-1213 | Confirmation Confirmed (complete match) |
| HJK33 | Route -> GHJ to LJK to 555-555-1315 to HJK33 | Not Authenticated | 555-555-1315 | Route -> GHJ to LJK to 555-555-1315 | Confirmation Denied |
| JKL33 | Route -> GHJ to JJJ to LLL to JKL33 | Authenticated | 555-555-1415 | Route -> GHJ to JJ3 to LL3 to 555-555-1415 | Authentication Denied |

Figure 1:
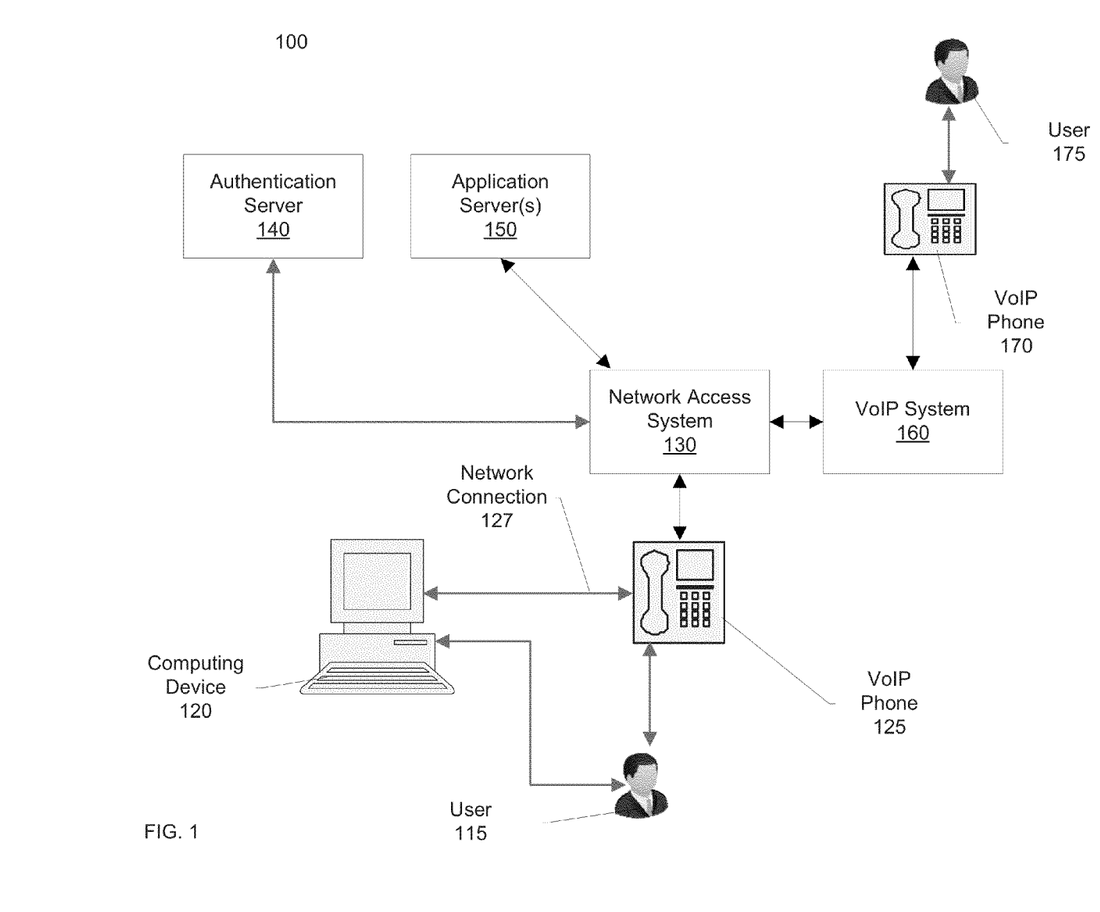
FIG. 1 is a diagram of a VoIP phone authentication environment.

FIG. 1 is a diagram of a VoIP phone authentication environment 100. The environment 100 includes a computing device 120, a VoIP phone 125, a network access system 130, an authentication server 140, application servers 150, a VoIP system 160, and a VoIP phone 170. A user 115 can utilize the computing device 120 and/or the VoIP phone 125. Another user 175 can utilize the VoIP phone 170. The users 115 and 175 can initiate phone calls between each other utilizing the VoIP phone 125, the VoIP phone 170, and the VoIP system 160. In some examples, the user 115, via the VoIP phone 125, can access a directory server for call information (e.g., phone number, name) about a VoIP call.

The user 115 can initiate a phone call with the user 175 by utilizing the VoIP phone 125. The VoIP phone 125 communicates with the VoIP system 160 to setup a phone call with the VoIP phone 170. The VoIP system 160 can verify that the VoIP phone 125 is authorized to access the network by validating that the computing device 120 associated with the VoIP phone 125 is authenticated to access the network. In other words, authentication for the VoIP phone 125 can originate from the authentication for the associated computing device 120, thereby reducing administrative overhead for the authentication process and increasing the overall security for the network.

Figure 2:
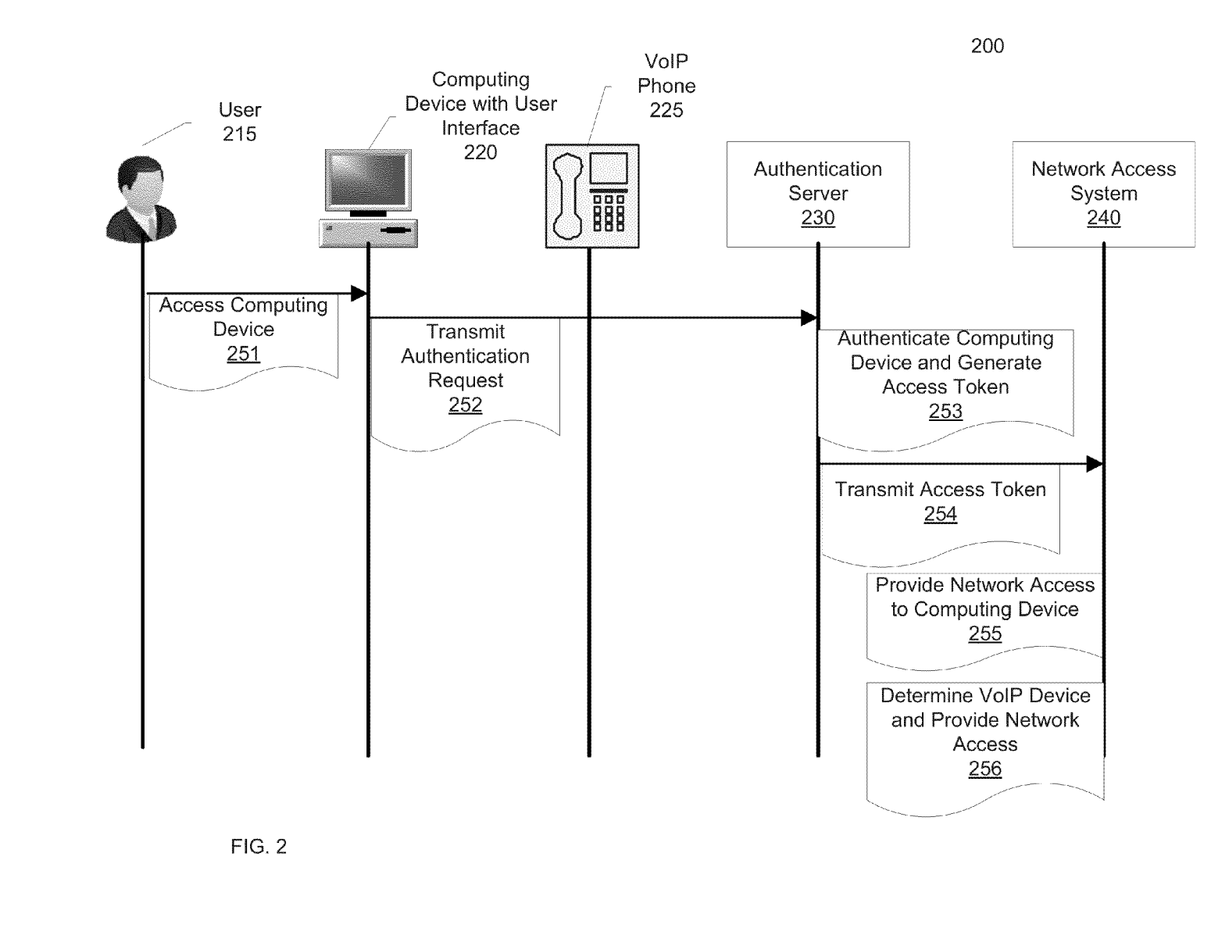
FIG. 2 is a diagram of a phone authentication process.

FIG. 2 is a diagram of a phone authentication process 200. A user 215 accesses (251) a computing device 220 with a user interface. For example, the user 215 can enter his/her login and password information utilizing the user interface on the computing device 220. The computing device 220 transmits (252) the authentication request (e.g., login and password, encrypted packet) to an authentication server 230. The authentication server 230 authenticates (253) the computing device 220 and generates an access token (e.g., encrypted packet with identifier, uniquely generated token). The authentication server 230 transmits (254) the access token to a network access system 240 (e.g., router, switch, access layer switch). The network access system 240 provides (255) network access to the computing device 220. The network access system 240 determines (256) if a VoIP device 225 is associated with the computing device 220 and, if so, provides (256) network access to the VoIP device 225.

Although FIG. 2 illustrates the network access system 240 providing (256) access to the network, in some examples, the VoIP phone 225 requests access to the network and the network access system determines (256) if the VoIP phone 225 is associated with the computing device 220 based on the request from the VoIP phone 225. The authentication of the VoIP phone 225 via the authentication of the computing device 220 advantageously provides an automated authentication mechanism for the VoIP phone 225 which reduces authentication costs for the system and increases the overall security for the system. In other examples, the VoIP phone 225 includes a pluggable authentication module (PAM) that communicates with the authentication server 230 to authenticate the VoIP phone 225. In some examples, the network access system 240 provides (256) network access to the VoIP phone 225 by instructing a VoIP system and/or a private branch exchange (PBX) to allow the extension to be used (e.g., unbusy the extension, create station, release station).

Figure 3:
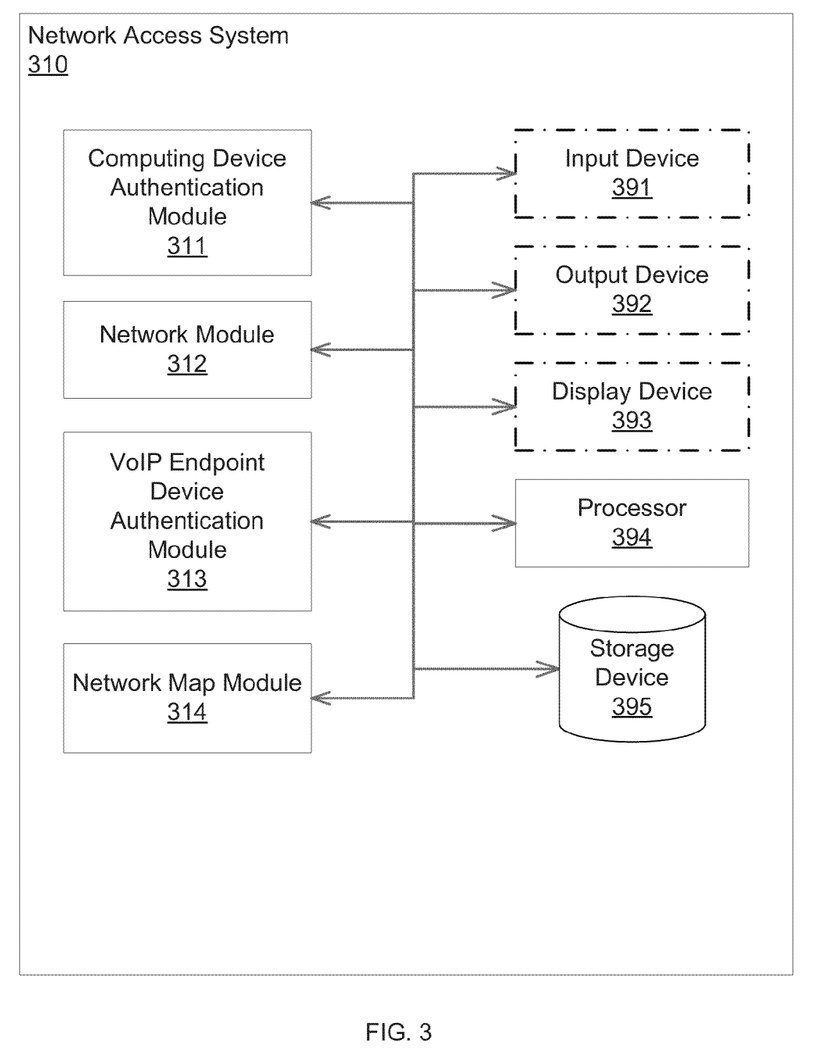
FIG. 3 is a diagram of a network access system.

FIG. 3 is a diagram of a network access system 310. The network access system 310 includes a computing device authentication module 311, a network module 312, a VoIP endpoint device authentication module 313, a network map module 314, an input device 391, an output device 392, a display device 393, a processor 394, and a storage device 395. The input device 391, the output device 392, and the display device 393 are optional components of the network access system 310. The modules and devices described herein can, for example, utilize the processor 394 to execute computer executable instructions and/or the modules and devices described herein can, for example, include their own processor to execute computer executable instructions (e.g., an encryption processing unit, a field programmable gate array processing unit). It should be understood the network access system 310 can include, for example, other modules, devices, and/or processors known in the art and/or varieties of the illustrated modules, devices, and/or processors.

The computing device authentication module 311 authenticates a computing device for access to a network based on an authentication request. The authentication request is received from the computing device via a voice over internet protocol (VoIP) endpoint device.

The network module 312 determines if the VoIP endpoint device is associated with a network address associated with the authentication request. In some examples, the network module 312 determines the network address associated with the authentication request based on the map of the network. The network module 312 determines a network address of the VoIP endpoint device based on the map of the network. The network module 312 compares the network address and the network address of the VoIP endpoint device.

In other examples, the network module 312 determines a network route associated with the authentication request based on the map of the network; determines a network route associated with the VoIP endpoint device based on the map of the network; and compares the network route associated with the authentication request and the network route associated with the VoIP endpoint device.

The VoIP endpoint device authentication module 313 authenticates the VoIP endpoint device based on the determination if the VoIP endpoint device is associated with the network address. The network map module 314 generates a map of a network associated with the network access system based on network communications through the network access system. The map of the network can include a listing of the associated network devices (e.g., computing device, VoIP endpoint device) and the network addresses for the network devices. For example, the map of the network includes a table of the network devices and network addresses. In some examples, the access layer switches in the network maintain individual maps and communicate the individual maps to the network map module 314. In other examples, the network map module 314 queries the access layer switches and request the maps of the network devices connected to the respective access layer switch.

The input device 391 receives information associated with the network access system 310 from a user (not shown) and/or another computing system (not shown). The input device 391 can include, for example, a keyboard and/or a scanner. The output device 392 outputs information associated with the network access system 310 (e.g., information to a printer (not shown), information to a speaker).

The display device 393 displays information associated with the network access system 310 (e.g., status information, configuration information, graphical representation). The processor 394 executes the operating system and/or any other computer executable instructions for the network access system 310 (e.g., executes applications).

The storage device 395 stores authentication information and/or call configuration. The storage device 395 can include a plurality of storage devices and/or the network access system 310 can include a plurality of storage devices (e.g., a call configuration storage device, an audio storage device). The storage device 395 can include, for example, long-term storage (e.g., a hard drive, a tape storage device, flash memory), short-term storage (e.g., a random access memory, a graphics memory), and/or any other type of computer readable storage.

Figure 4:
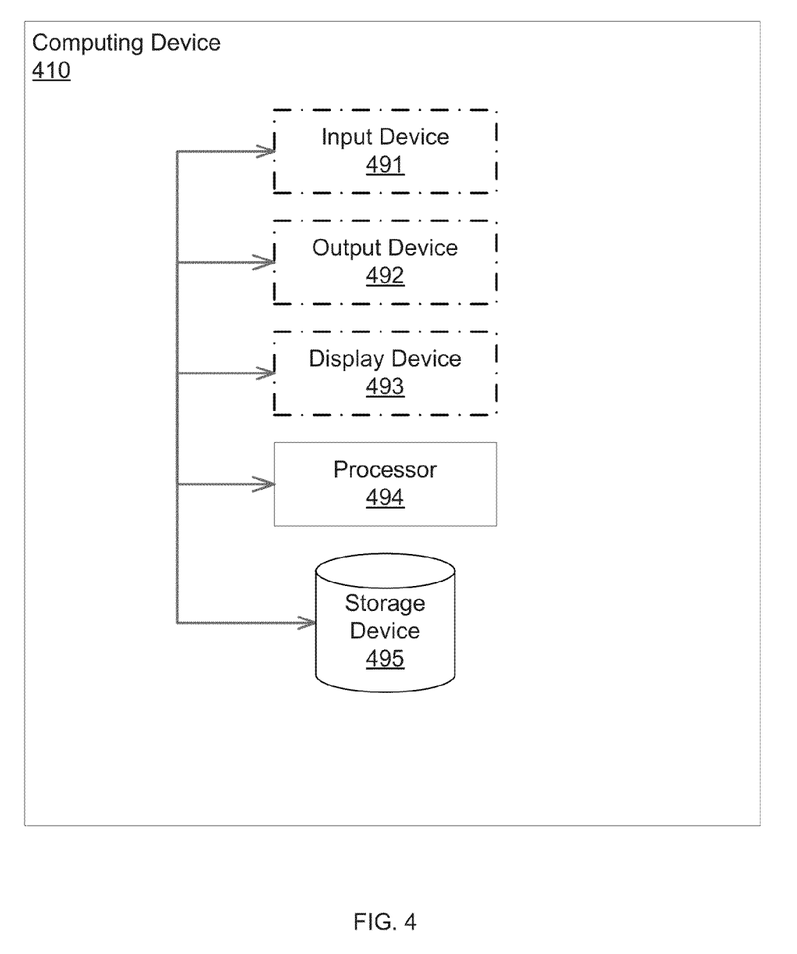
FIG. 4 is a diagram of a computing device.

FIG. 4 is a diagram of a computing device 410 (e.g., stand-alone computer, hand-held computer). The computing device 410 includes an input device 491, an output device 492, a display device 493, a processor 494, and a storage device 495. The input device 491, the output device 492, and the display device 493 are optional components of the computing device 410. The modules and devices described herein can, for example, utilize the processor 494 to execute computer executable instructions and/or the modules and devices described herein can, for example, include their own processor to execute computer executable instructions (e.g., an encryption processing unit, a field programmable gate array processing unit). It should be understood the computing device 410 can include, for example, other modules, devices, and/or processors known in the art and/or varieties of the illustrated modules, devices, and/or processors.

The input device 491 receives information associated with the computing device 410 from a user (not shown) and/or another computing system (not shown). The input device 491 can include, for example, a keyboard and/or a scanner. The output device 492 outputs information associated with the computing device 410 (e.g., information to a printer (not shown), information to a speaker).

The display device 493 displays information associated with the computing device 410 (e.g., status information, call information, graphical representation). The processor 494 executes the operating system and/or any other computer executable instructions for the computing device 410 (e.g., executes applications).

The storage device 495 stores call information and/or call configuration. The storage device 495 can include a plurality of storage devices and/or the computing device 410 can include a plurality of storage devices (e.g., a call configuration storage device, a voice storage device). The storage device 495 can include, for example, long-term storage (e.g., a hard drive, a tape storage device, flash memory), short-term storage (e.g., a random access memory, a graphics memory), and/or any other type of computer readable storage.

Figure 5:
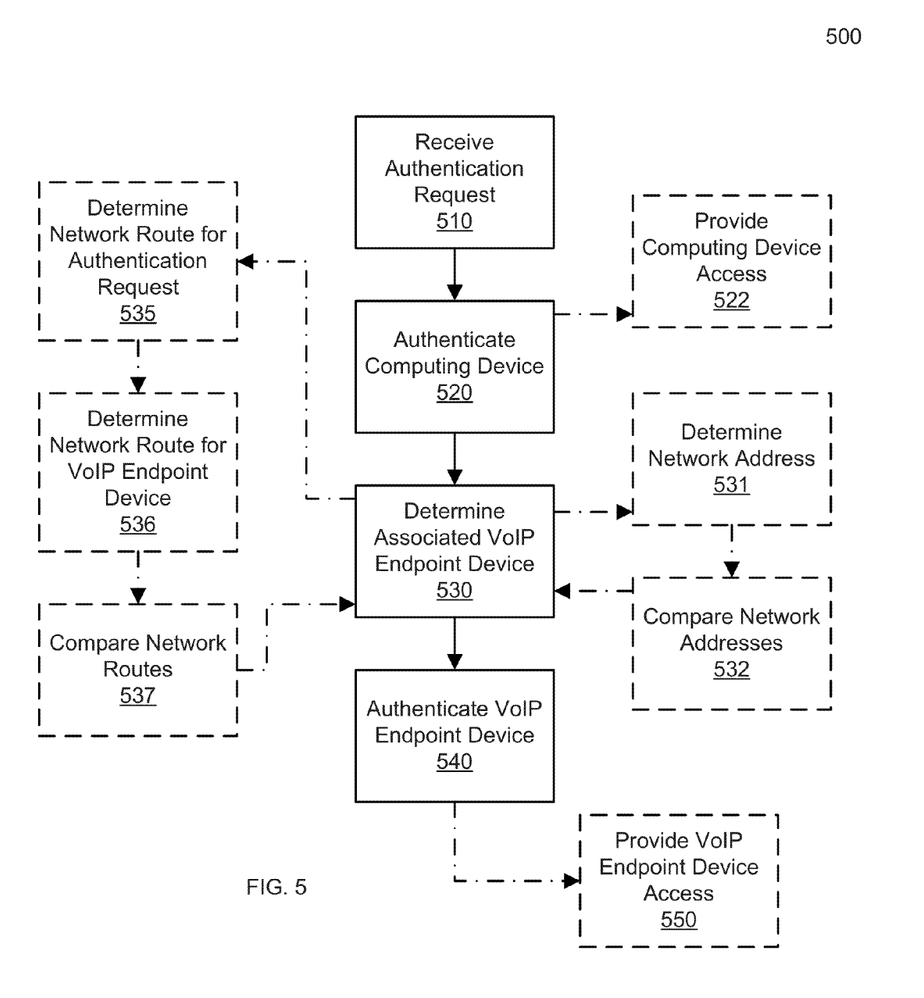
FIG. 5 is a flowchart of a phone authentication process.

FIG. 5 is a flowchart of a phone authentication process utilizing the system 100 of FIG. 1. The network access system 130 receives (510) an authentication request from a computing device 120. The network access system 130 authenticates (520) the computing device 120 for access to a network based on the authentication request. The network access system 130 determines (530) if a VoIP endpoint device 125 is associated with a network address associated with the authentication request. The network access system 130 authenticates (540) the VoIP endpoint device 125 if the VoIP endpoint device 125 is associated with the network address.

In some examples, the authentication request is relayed via the VoIP endpoint device 125. In other examples, the network access system 130 determines (531) the network address (e.g., medium access control (MAC) address, internet protocol (IP) address, etc.) associated with the authentication request. The network access system 130 compares (532) the network address and a network address of the VoIP endpoint device (e.g., MAC addresses comparison, packet routes comparison, etc.).

In some examples, the network access system 130 determines (535) a network route associated with the authentication request. The network access system 130 determines (536) a network route associated with the VoIP endpoint device. The network access system 130 compares (537) the network route associated with the authentication request and the network route associated with the VoIP endpoint device.

In other examples, the network address includes a medium access control (MAC) address, an internet protocol address, a physical layer address, and/or a transport layer address. In some examples, the network access system 130 provides (522) the computing device 120 with access to one or more application servers based on the authentication of the computing device 120. In other examples, the network access system 130 provides (550) the VoIP endpoint device 125 with access to a VoIP system 160 based on the authentication of the VoIP endpoint device 125.

Figure 6:
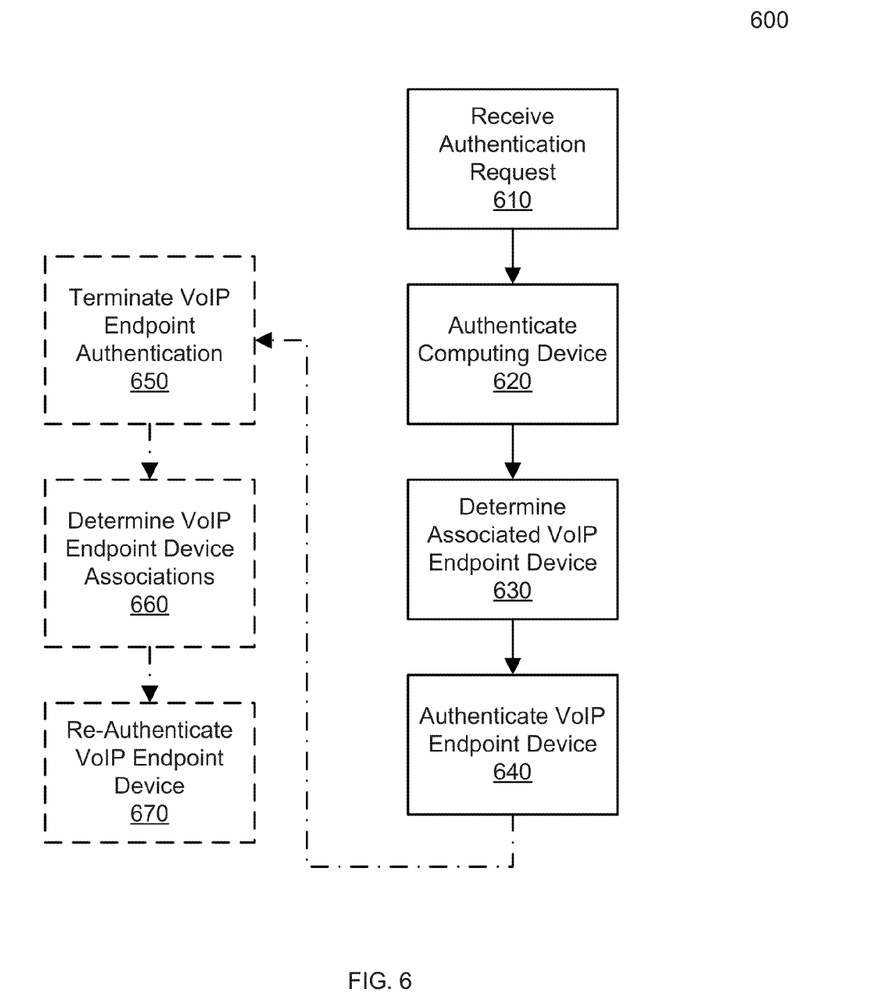
FIG. 6 is a flowchart of a phone authentication process.

FIG. 6 is a flowchart of a phone authentication process utilizing the system 100 of FIG. 1. The network access system 130 receives (610) an authentication request from a computing device 120. The network access system 130 authenticates (620) the computing device 120 for access to a network based on the authentication request. The network access system 130 determines (630) if a VoIP endpoint device 125 is associated with a network address associated with the authentication request. The network access system 130 authenticates (640) the VoIP endpoint device 125 if the VoIP endpoint device 125 is associated with the network address.

In some examples, the network access system 130 terminates (650) authentication of the VoIP endpoint device 125 based on a timeout parameter (e.g., defined time period, dynamic time period, dynamic time period based on last access and number of accesses). The network access system 130 determines (660) if the VoIP endpoint device 125 is associated with the network address associated with an authenticated computing device 120. The network access system 130 re-authenticates (670) the VoIP endpoint device 125 based on the determination if the VoIP endpoint device 125 is associated with the authenticated computing device 120.

In other examples, the timeout parameter is a predetermined timeout parameter (e.g., ten minutes, eight hours), a dynamically generated timeout parameter (e.g., based on last access, based on number of accesses in last two days), and/or an operating time period for the VoIP endpoint device (e.g., eight hours, twelve hours).

Figure 7:
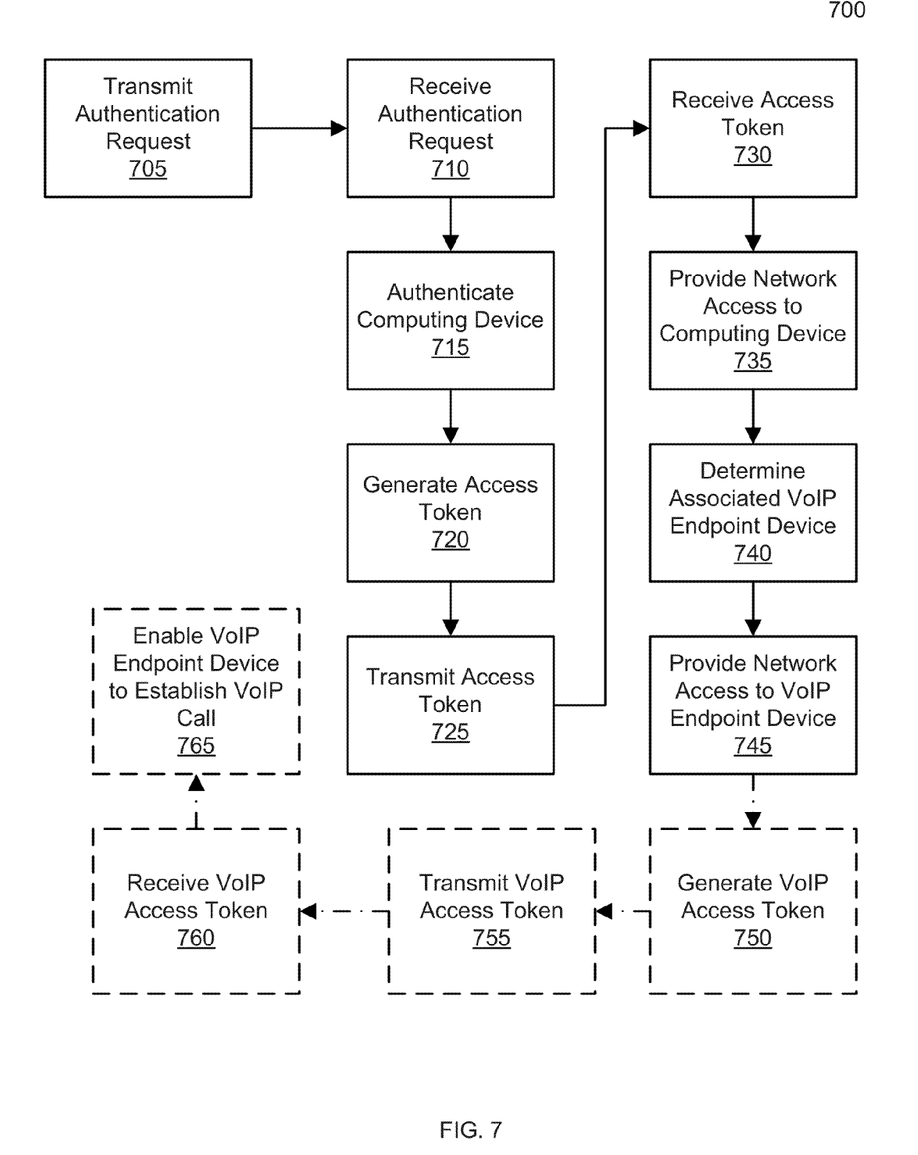
FIG. 7 is a flowchart of a phone authentication process.

FIG. 7 is a flowchart of a phone authentication process utilizing the system 100 of FIG. 1. The computing device 120 transmits (705) an authentication request (e.g., Kerberos request, secure remote password protocol request, remote authentication dial in user service (RADIUS) request) for a user to an authentication server 140. The authentication request is relayed via a VoIP endpoint device 125. The computing device 120 and the VoIP endpoint device 125 are associated with the user 115 (e.g., the user 115 utilizes both the computing device 120 and the VoIP endpoint device 125, the user 115 is assigned to both the computing device 120 and the VoIP endpoint device 125).

The authentication server 140 receives (710) the authentication request from the computing device 120 via the VoIP endpoint device 125. The authentication server 140 authenticates (715) the computing device 120 based on the authentication request. The authentication server 140 generates (720) an access token for the computing device 120 based on the authentication of the computing device 120. The authentication server 140 transmits (725) the access token to a network access system 130.

The network access system 130 receives (730) the access token from the authentication server. The network access system 130 provides (735) network access (e.g., access to a local area network, access to a remote application server, access to a wide area network) to the computing device 120 via the network access system 130 based on the access token. The network access system 130 determines (740) if the VoIP endpoint device 125 is associated with a network address of the computing device 120. The network access system 130 provides (745) network access to the VoIP endpoint device 125 if the VoIP endpoint device 125 is associated with the network address of the computing device 120.

In some examples, the network access system 130 denies network access to the VoIP endpoint device 125 based on de-authentication of the associated computing device 120. In other examples, the network access system 130 generates (750) a VoIP access token for the VoIP endpoint device 125 if the VoIP endpoint device 125 is associated with the network address of the computing device 120. The network access system 130 transmits (755) the VoIP access token to a VoIP system 160.

In some examples, the VoIP system 160 receives (760) the VoIP access token from the network access system 130. The VoIP system 160 enables (765) the establishment of a VoIP call by the VoIP endpoint device 125 based on the VoIP access token.

In other examples, the VoIP system 160 enables the VoIP endpoint device 125 for use by the user 115 based on the VoIP access token. In other examples, the network access system 130 relays communication between the computing device 120 and one or more application servers 150 based on the authentication of the computing device 120.

In some examples, the network access system 130 relays communication between the VoIP endpoint device 125 and a VoIP system 160 if the VoIP endpoint device 125 is associated with the network address of the computing device 120.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device, for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the disclosure by operating on input data and generating output. Method steps can also be performed by special purpose logic circuitry and/or an apparatus can be implemented on special purpose logic circuitry. The circuitry can, for example, be a FPGA (field programmable gate array) and/or an ASIC (application-specific integrated circuit). Subroutines and software agents can refer to portions of the computer program, the processor, the special circuitry, software, and/or hardware that implement that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from, and/or can transfer data to one or more mass storage devices for storing data (e.g., magnetic, magneto-optical disks, optical disks, etc.).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above-described techniques can be implemented on a computer having a display device. The display device can, for example, be a cathode ray tube (CRT) and/or a liquid crystal display (LCD) monitor. The interaction with a user can, for example, be a display of information to the user and a keyboard and a pointing device (e.g., a mouse or a trackball) by which the user can provide input to the computer (e.g., interact with a user interface element). Other kinds of devices can be used to provide for interaction with a user. Other devices can, for example, provide feedback to the user in any form of sensory feedback (e.g., visual feedback, auditory feedback, or tactile feedback). Input from the user can, for example, be received in any form, including acoustic, speech, and/or tactile input.

The above-described techniques can be implemented in a distributed computing system that includes a back-end component. The back-end component can, for example, be a data server, a middleware component, and/or an application server. The above-described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system can include clients and servers. A client and a server are generally remote from each other and typically interact through a communication network. The relationship of client and server arises by virtue of computer programs running on the respective computers and having a client-server relationship to each other.

Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device can include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a world wide web browser (e.g., Google Chrome available from Google Inc., Mozilla® Firefox available from Mozilla Corporation). The mobile computing device includes, for example, a device utilizing an Android operating system.

Comprise, include, and/or plural forms of each are open-ended and include the listed parts and can include additional parts that are not listed. And/or is open-ended and includes one or more of the listed parts and combinations of the listed parts.

One skilled in the art will realize the disclosure may be embodied in other specific forms without departing from the spirit or essential characteristics thereof. The foregoing embodiments are therefore to be considered in all respects illustrative rather than limiting of the disclosure described herein. Scope of the disclosure is thus indicated by the appended claims, rather than by the foregoing description, and all changes that come within the meaning and range of equivalency of the claims are therefore intended to be embraced therein.

What is claimed is:

1. A voice over internet protocol (VoIP) phone authentication method, the method comprising:
   receiving an authentication request from a computing device connected to a VoIP endpoint device, wherein the authentication request is relayed via the VoIP endpoint device;
   authenticating the computing device for access to a network based on the authentication request;
   determining a network address associated with the computing device sending the authentication request;
   determining a network address associated with the VoIP endpoint device;
   comparing the network address associated with the computing device with the network address associated with the VoIP endpoint device;
   determining whether the VoIP endpoint device is associated with the computing device based on such comparison;
   authenticating the VoIP endpoint device if the VoIP endpoint device is determined to be associated with the network address of the computing device;
   generating a VoIP access token for the VoIP endpoint device if the VoIP endpoint device is associated with the network address of the computing device; and
   transmitting the VoIP access token to a VoIP system.

2. The method of claim 1, comprising denying network access to the VoIP endpoint device based on de-authentication of the associated computing device.

3. The method of claim 1, comprising:
   receiving the VoIP access token, and
   enabling establishment of a VoIP call by the VoIP endpoint device based on the VoIP access token.

4. The method of claim 1, comprising relaying communication between the computing device and one or more application servers, via the VoIP endpoint device, based on the authentication of the computing device.

5. A voice over internet protocol (VoIP) phone authentication system, the system comprising:
   a computing device configured to transmit an authentication request to an authentication server, the authentication request being relayed via a VoIP endpoint device;
   the authentication server configured to:
      receive the authentication request from the computing device via the VoIP endpoint device,
      authenticate the computing device based on the authentication request,
      generate an access token for the computing device based on the authentication of the computing device, and
      transmit the access token to a network access system; and
   the network access system configured to:
      receive the access token from the authentication server,
      provide network access to the computing device via the network access system based on the access token,
      determine if the VoIP endpoint device is associated with a network address of the computing device by analyzing network information regarding the VoIP endpoint device in relation to the computing device,
      provide network access to the VoIP endpoint device if the VoIP endpoint device is determined to be associated with the computing device,
      generate a VoIP access token for the VoIP endpoint device if the VoIP endpoint device is associated with the network address of the computing device, and
      transmit the VoIP access token to a VoIP system.

6. The system of claim 5, wherein the network access system is further configured to deny network access to the VoIP endpoint device based on de-authentication of the associated computing device.

7. The system of claim 5, wherein the VoIP system is configured to:
   receive the VoIP access token from the network access system, and
   enable establishment of a VoIP call by the VoIP endpoint device based on the VoIP access token.

8. The system of claim 5, wherein the network access system is further configured to relay communication between the computing device and one or more application servers based on the authentication of the computing device.

9. The system of claim 5, wherein the network access system is further configured to relay communication between the VoIP endpoint device and a VoIP system if the VoIP endpoint device is associated with the network address of the computing device.

* * * * *